Figure 1:
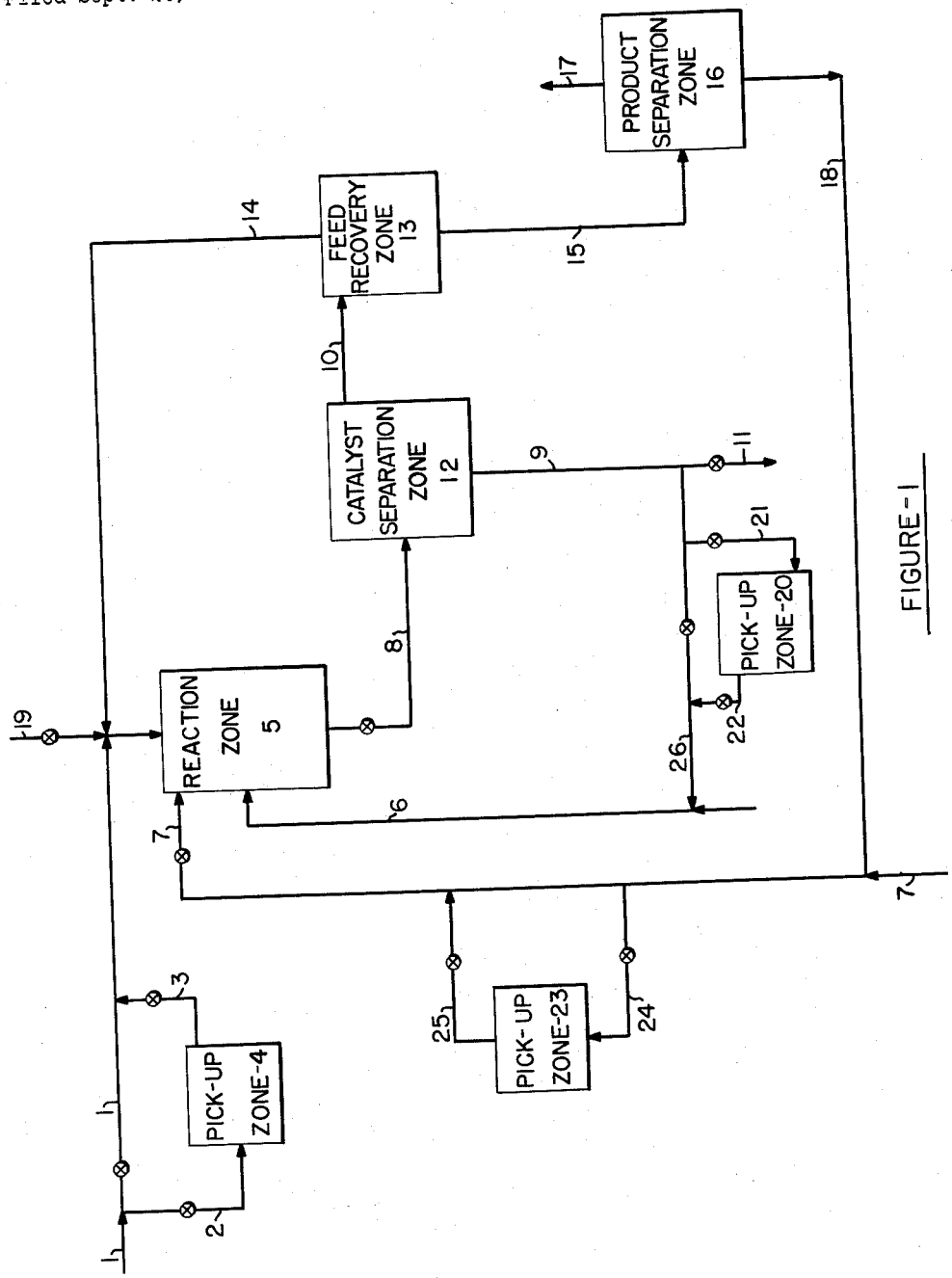

Sept. 19, 1961  J. E. HOFMANN  3,000,993
PARAFFIN ALKYLATION PROCESS
Filed Sept. 28, 1959  2 Sheets-Sheet 1

John E. Hofmann  Inventor

By *Richard N. Hagel*

Patent Attorney

Sept. 19, 1961      J. E. HOFMANN      3,000,993

PARAFFIN ALKYLATION PROCESS

Filed Sept. 28, 1959      2 Sheets-Sheet 2

John E. Hofmann     Inventor

By *Richard W. Nagel*

Patent Attorney

United States Patent Office 3,000,993
Patented Sept. 19, 1961

3,000,993
PARAFFIN ALKYLATION PROCESS
John E. Hofmann, Summit, N.J., assignor to Esso Research and Engineering Company, a corporation of Delaware
Filed Sept. 28, 1959, Ser. No. 842,914
4 Claims. (Cl. 260—683.57)

This invention concerns a process wherein certain small paraffin hydrocarbons are alkylated with other larger paraffin hydrocarbons to produce branched chain paraffin hydrocarbons. Such a process can be termed a paraffin alkylation process. More specifically, the invention relates to a process for producing $C_5$ to $C_7$ branched chain paraffin hydrocarbons by reacting butane or pentane with a paraffin hydrocarbon of from 6 to 18 carbon atoms in the presence of a liquid aluminum bromide-hydrocarbon complex containing at least about 75 wt. percent $AlBr_3$ and free aluminum bromide maintained in the reactant and product phase.

One of the major problems in the petroleum industry is to supply a sufficient quantity of motor fuels having a high enough octane rating to satisfy the demands of modern high compression internal combustion engines. Suitable processes for this purpose must not be too costly and must have a fair degree of versatility. Polymerization of olefins to gasoline hydrocarbons and the alkylation of olefins, such as butylenes, with isoparaffins, such as isobutane, have been used in the past as sources of high octane rating fuel components, but these processes require the use of olefins whose supply is somewhat limited. More recently, $C_5$ to $C_7$ branched chain saturated paraffin hydrocarbons have been obtained by paraffin alkylation processes which employ solid aluminum halide, such as $AlBr_3$, either alone or supported by a medium, such as gamma alumina, as the catalysts. Although these catalysts have gone far to improve the paraffin alkylation process, they deactivate rapidly, are expensive to make and do not produce an extremely high conversion rate.

It has now been discovered that high yields of $C_5$ to $C_7$ branched chain saturated paraffin hydrocarbons of high octane rating may be obtained in a direct reaction of butanes or pentanes with higher paraffin hydrocarbons of from 6 to 18 carbon chain lengths by employing a liquid aluminum bromide-hydrocarbon complex catalyst which contains at least about 75 wt. percent $AlBr_3$ and by maintaining free aluminum bromide in the liquid phase containing the reactants and reaction products. The aluminum bromide-hydrocarbon complex herein referred to is immiscible with the reactants and reaction products and thus two distinct liquid phases are existent during the instant process. Hereinafter the term "complex phase" will refer to the liquid phase wherein the aluminum bromide-hydrocarbon complex is found and the term "hydrocarbon phase" will refer to the liquid phase wherein the reactants and reaction products are found.

In more particularity, the aluminum bromide-hydrocarbon complex catalyst of the instant invention must at least be saturated with $AlBr_3$, that is, all the hydrocarbons in the complex phase must be in the form of the aluminum bromide-hydrocarbon complex. Complex phases fulfilling this requirement will contain at least about 75 wt. percent $AlBr_3$. Additionally, it is critical in the instant improved process that free $AlBr_3$ be maintained in the hydrocarbon phase for reasons given hereinafter. The latter may be accomplished in a variety of ways. For example, $AlBr_3$ may be dissolved in the feed streams or catalyst recycle stream. The instant paraffin alkylation process has the advantage of high yields, low catalyst cost, and high octane quality product.

The aluminum bromide-hydrocarbon complex, which is the catalyst in the instant process, is prepared by adding excess solid $AlBr_3$ to a liquid paraffinic or olefinic hydrocarbon and bubbling gaseous HBr through the mixture. Trace impurities of water initiate the reaction which form the aluminum bromide-hydrocarbon complex, but once formed the complex is a catalyst for its own formation. The aluminum bromide-hydrocarbon complex separates from the liquid paraffin or olefin phase as a distinct, brown, homogeneous liquid layer. The liquid catalyst may be separated from the paraffin or olefin layer by decanting or any other known method for separating distinct liquid phases from one another. The formation of the aluminum bromide-hydrocarbon complex is achieved at temperatures in the range of from about 50 to 150° F., preferably 60 to 100° F. Pressure conditions are important only in maintaining the reactants and product in the liquid phase. Any olefin or paraffin may be employed which will be in the liquid phase within the operating conditions heretofore mentioned, however, it is preferred to employ heptanes, octanes, or dilute olefin solution.

To insure that the aluminum bromide-hydrocarbon complex phase contains greater than a saturated amount of $AlBr_3$, i.e., that all the hydrocarbons therein have formed a complex with $AlBr_3$, an excessive amount of $AlBr_3$ is added to the paraffin or olefin reactant. A portion of this excess will migrate as free $AlBr_3$ to the complex phase as it forms. The resultant complex phase, after being separated from the reactant phase as discussed above, will contain free $AlBr_3$ and is extracted with a liquid paraffin hydrocarbon, such as pentane, hexane, or the like, which will selectively remove the free $AlBr_3$. Any known liquid extraction technique may be employed. Temperatures during the extraction step may vary from about 50 to 150° F. preferably 60 to 100° F. When the excess $AlBr_3$ has been completely removed from the complex phase, i.e., when the extract phase contains little or no dissolved free $AlBr_3$, the extraction is discontinued. A complex phase is thus obtained which comprises solely aluminum bromide-hydrocarbon complex. Although the exact nature of this complex is not known, a saturated complex phase will contain about 75 wt. percent $AlBr_3$. The particular paraffin or olefin employed to form the aluminum bromide-hydrocarbon complex does not affect the $AlBr_3$ content in the saturated complex more than about ±1 wt. percent. In other words, in all cases the saturated complex, that is, one consisting essentially of aluminum bromide-hydrocarbon complex, will contain about 75 wt. percent $AlBr_3$.

However, the aluminum bromide-hydrocarbon complex formed as described above is an effective catalyst in the instant improved paraffin alkylation process only when the hydrocarbon phase contains free $AlBr_3$. Merely conducting the paraffin alkylation process in the presence of a complex phase and free $AlBr_3$ would not yield the improved results obtained by the instant process for two reasons. First, the free $AlBr_3$ would not be in the hydrocarbon phase unless the complex phase contains at least about 75 wt. percent $AlBr_3$, i.e., is saturated with $AlBr_3$. Secondly, even if some free $AlBr_3$ is initially present in the hydrocarbon phase, it will form aluminum bromide-hydrocarbon complex with the olefins formed during the reaction. Thus, in a very short time the free $AlBr_3$ which is essential to obtain high yields, as demonstrated hereinafter, would be eliminated and the activity of the system substantially reduced.

Free $AlBr_3$ may be maintained in the hydrocarbon phase during the reaction by a variety of methods. For example, the $AlBr_3$ may be continually dissolved in one of the feed streams or a portion thereof. Furthermore, the saturated complex phase may be withdrawn, $AlBr_3$ added thereto and then recycled to the reaction zone. It is preferable that the complex phase contain free $AlBr_3$; that is, contain more than about 75 wt. percent $AlBr_3$, when the continuous process is to be started. In any event, there is always maintained in the hydrocarbon phase free $AlBr_3$ to achieve the improved results of the present invention.

With regard to the paraffin alkylation reaction, it has been found that, regardless of the particular heavier paraffin hydrocarbon that is used in the range of from 6 to 18 carbon atoms, the product distribution from the reaction described predominates in $C_5$ to $C_7$ isomers along with some hydrocarbons of 8 carbon atoms or more. While essentially the same product distribution is obtained with hexane as with heptane, the reaction rate, when employing the former, is lower by a factor of about 3. Hence it is preferred to employ heptane or larger paraffin hydrocarbons rather than hexane.

The nature and objects of the invention will be more readily understood when reference is made to FIGURE 1 which is a schematic flow plan of a suitable manner for practicing the invention.

The process will be described with particular reference to the use of isobutane as the lighter component. Referring to the drawing in detail, a suitable butane feed stream containing at least initially a major proportion of isobutane is obtained by means of line 1 from a suitable source. A portion, or all, of the stream is conducted via line 2 through an aluminum bromide pick-up zone 4 to dissolve aluminum bromide in at least a portion of the stream which is conducted to the reaction zone. If only a portion of the feed stream is directed to the pick-up zone 4, the remainder of the feed stream is combined with the effluent leaving the pick-up zone via line 3 and is conducted into reaction zone 5. In zone 5 the feed stream 1 is mixed with the higher paraffin feed entering therein via line 7 and the liquid aluminum bromide-hydrocarbon complex catalyst entering therein via line 6. There is maintained in the reaction zone a ratio of complex to total feed in the range of about 0.25:1 to 1:1, preferably between about 0.5:1 to 0.8:1. The reactants, liquid catalyst and product are vigorously agitated and maintained in the liquid phase by the use of temperature and pressure conditions previously discussed. A promoter, such as hydrogen bromide or an alkyl bromide, may be added to the reaction zone through line 19.

The mol ratio of isobutane and/or isopentane to the higher parffin may be within the range of about 0.5:1 to 20:1, preferably about 1:1 to 2:1. If sufficient isobutane is not present in the reaction zone to effect alkylation of the materials obtained when a higher parffin or other higher product of the reaction is cracked by the catalyst, catalyst sludging will result. The feed stock must be essentially free of aromatic hydrocarbons and not more than about 0.02 wt. percent of such material should be present. The aromatics may be removed from the feed stock by conventional techniques (not shown), such as solvent extraction, hydrogenation, acid treating and the like, as well as treatment with selective adsorbents, such as molecular sieve zeolites.

The mixture of reaction products and liquid aluminum bromide-hydrocarbon complex catalyst is continually withdrawn from the reaction zone 5 and directed to catalyst separation zone 12 by means of line 8. In catalyst separation zone 12 the hydrocarbon phase and the complex phase settle out into tow distince layers, the former being withdrawn by line 10 and the latter by line 9.

The complex phase may be removed from the system by line 11, however, it is preferred that a portion thereof be recycled to reaction zone 5 by means of lines 26 and 6. As has been previously explained, aluminum bromide-hydrocarbon complex will be formed during the reaction in zone 5 by the reaction of olefins with some of the free $AlBr_3$ in the hydrocarbon phase. The complex so formed will migrate to the complex phase. Thus, the complex phase increases in size during the reaction. After the continuous system is in full operation, the supply of complex from line 6 may be discontinued and the necessary complex supplied entirely by recycle through lines 9, 26, and 6. It will be necessary, however, to withdraw some of the complex phase from the system through line 11 to compensate for the complex which formed during the reaction in zone 5.

The hydrocarbon phase may be treated in various manners to separate the desirable products from the undesirable and unreacted materials. As illustrated the hydrocarbon phase may be conducted into a feed recovery zone 13 wherein light materials, including unreacted isobutane and normal butane, are removed overhead and recycled to the reaction zone by means of line 14. Hydrogen bromide or alkyl bromides, will also be recycled via line 14. The heavier material, including $C_5$ hydrocarbons and higher, is conducted by means of line 15 into a product separation zone 16 wherein $C_5$ to $C_7$ hydrocarbons are removed overhead by means of line 17, while the heavier material comprising $C_8$ hydrocarbons and higher, as well as any aluminum bromide that has been removed from the reaction zone is recycled thereto by means of line 18. If desired, conditions can be adjusted in separation zone 16 to include normal heptane in the heavier material recycled through line 18, while including the $C_7$ branched chain isomers in overhead line 17.

If desired the free $AlBr_3$ may be maintained in the hydrocarbon phase through the heavy paraffin feed by conducting all or a portion of stream 7 through an aluminum bromide pick-up zone 23 by means of line 24. If only a portion of this feed stream is directed to pick-up zone 23, the remainder of the feed stream is combined with the effluent leaving zone 23 through line 25 and directed into reaction zone 5. In the same manner, the complex catalyst of lines 9, 26, and 6 could serve to carry the free $AlBr_3$ to the reaction zone by the use of a similar aluminum bromide pick-up zone 20 and lines 21 and 22. In place of the isobutane the feed in line 1 may comprise normal butane, in which case no higher hydrocarbon feed stock will be sent initially to the reaction zone but the butane will be recycled through line 8, zone 12, line 10, zone 13 and line 14 until a considerable amount of butane has been isomerized to isobutane. The process may then continue in the manner already described, the recycle isobutane being sufficient to make the desired reaction proceed while fresh butane feed becomes isomerized to isobutane in the reactor.

Although the reaction proceeds in a new and improved manner in the absence of a promoter, additionally increased yields may be obtained by the addition of HBr or alkyl bromides; such as, methyl, ethyl, propyl, or butyl bromide, to the reaction zone. Thus, the use of such a promoter is preferred. A range of from about 0.5 to 5% of HBr by weight based on total feed may be used with about 0.5 to 1% being preferred. The amount of alkyl bromide employed may be within the range of from about 0.1 to 1.0% by weight based on total feed, preferably 0.2 to 0.5%. The hydrogen bromide or alkyl bromide is introduced into the reaction zone by means of line 19 and is recycled to the reaction zone along with the unreacted butanes by means of line 14.

It is not necessary that the higher hydrocarbons used be individual hydrocarbons, such as heptane or octane or cetane, for example, but mixtures may be used, such as a petroleum fraction containing paraffinic hydrocarbons in the range 6 to 18 carbon atoms. Although, as stated, hexane is one of the higher hydrocarbons that may be used, it is preferred to employ heptane or higher for the reasons given above. Other sources of the higher paraffin hydrocarbons for the reaction include light virgin naphthas and paraffin raffinates from the extraction of hydro-formed petroleum fractions.

EXAMPLE I

The aluminum bromide-hydrocarbon complex was prepared simply by mixing pure, anhydrous AlBr₃ with a paraffin hydrocarbon. As these two materials were mechanically mixed, the AlBr₃ dissolved in the hydrocarbon and a separate distinct lower layer formed which was the complex. The complex forms much more rapidly with the heavier paraffins, heptane and octane, and can be hastened by the addition of anhydrous HBr to the solution. The complex layer was separated and washed repeatedly with isopentane until no further free AlBr₃ was extracted. The AlBr₃ content in the resultant complex layer, which is essentially entirely aluminum bromide-hydrocarbon complex, was determined from a bromide analysis. The bromide analysis consisted of water hydrolysis followed by potentiometric titration of the aqueous solution. The wt. percent AlBr₃ in saturated complexes prepared in the above-described manner with various paraffin hydrocarbons is shown in the Table A below:

*Table A*

WT. PERCENT AlBr₃ IN COMPLEX PREPARED WITH VARIOUS PARAFFIN HYDROCARBONS

| Paraffin hydrocarbon employed: | Wt. percent AlBr₃ in complex prepared therefrom [1] |
|---|---|
| Isopentane | 75 |
| 2,2-dimethylbutane | 76 |
| n-Heptane | 76 |
| 2,2,4-trimethylpentane | 74 |

[1] Analysis for inorganic bromide.

It may be seen from Table A that the wt. percent of AlBr₃ in the saturated complex phase is about the same even when different paraffinic hydrocarbons are employed in the production of the saturated complex.

EXAMPLE II

The AlBr₃ content of a sample of the saturated complex, as prepared in Example I with n-heptane, was reduced by contacting this complex with a catalytic pentane fraction containing about 40% olefins. The resulting complex contained about 60 wt. percent AlBr₃. This complex was then split up into individual 20 cc. samples. AlBr₃ was added to each sample in varying amounts. All work was carried out under dry conditions in glass apparatus at room temperature.

Analysis for aluminum in the complex was carried out in the following manner: The sample was first dissolved in methanol. Aluminum, as the methylate, Al(OCH₃)₃, was complexed with Alizarin. The intensity of this red complex was measured spectrophotometrically. By means of a previously established master calibration curve, the aluminum content was determined and the equivalent AlBr₃ calculated therefrom.

The various complex phases prepared as described above were individually added in amounts of 20 cc. to 50 cc. of n-C₆. The mixture was vigorously shaken and then allowed to settle. The hydrocarbon phase was then separated from the complex phase and the AlBr₃ content in the former determined by water hydrolysis and potentiometric titration. In this case the AlBr₃ content of the complex represents the average of the analyses for bromide and aluminum. The results for the various complex phases are given below and have been graphically represented in FIGURE 2.

*Table B*

| Wt. percent AlBr₃ in complex phase: | Wt. percent AlBr₃ in hydrocarbon phase |
|---|---|
| 60.8 | 0.031 |
| 66.6 | 0.024 |
| 68.3 | 0.024 |
| 68.6 | 0.021 |
| 70.8 | 0.017 |
| 76.4 | 0.282 |
| 76.9 | 1.29 |
| 85.3 | 2.43 |
| 86.1 | 1.41 |
| 91.4 | 2.73 |

Figure 2:
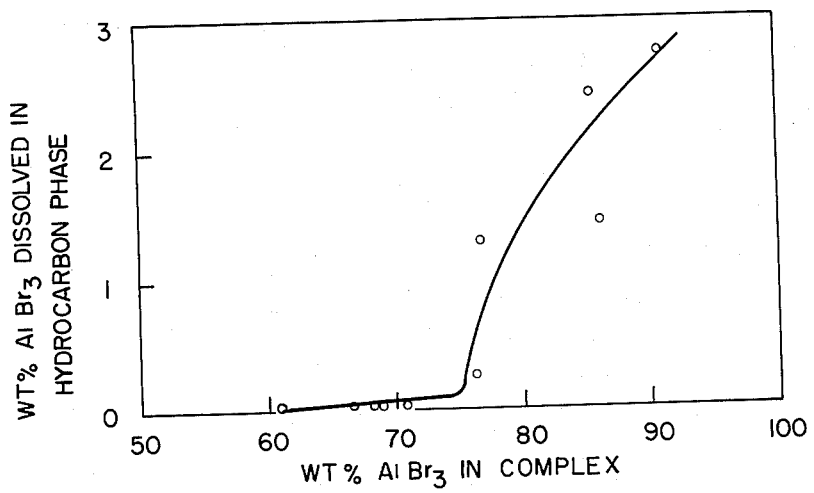

It may be seen from Table B and its graphical representation in FIGURE 2 that free AlBr₃, in quantities other than trace impurities, may be present in the hydrocarbon phase only when the complex phase contains free AlBr₃, which occurs only when the complex phase contains at least about 75 wt. percent AlBr₃. Thus, until the complex phase is saturated with AlBr₃, i.e., contains essentially aluminum bromide-hydrocarbon complex, substantially all of the free AlBr₃ added to the system will go into the complex phase.

EXAMPLE III

The experiments referred to in this example were all made in a continuous pilot unit. The reactor consists of a mechanically stirred 2 gallon autoclave, half of which contains an internal settler. The reaction volume is therefore considered to be 1 gallon. The initial catalyst charge for these experiments consisted of 600 cc. of the saturated complex, as prepared in Example I from n-heptane. Isobutane and n-heptane were fed continuously to the reactor at 1450 and 200 cc./hour, respectively. HBr was also added continuously as a promoter. AlBr₃ dissolved in the hydrocarbon phase of the reaction zone was varied by varying the amount of AlBr₃ dissolved in the isobutane feed.

The total hydrocarbon product was analyzed for hydrocarbon type by gas-liquid partition chromatography, for aluminum by the Alizarin technique and for bromide by titration. The aluminum bromide concentration was calculated from the aluminum analyses and the HBr concentration calculated from the bromide analyses after correcting for the bromide present as aluminum bromide.

*Table C*

ACTIVITY OF AlBr₃-HYDROCARBON COMPLEX CATALYST

| | | | |
|---|---|---|---|
| AlBr₃ Dissolved in Feed, wt. percent | 0.1 | 0.25 | 1.4 |
| AlBr₃ Dissolved in Reactor, Hydrocarbon Phase, wt. percent | 0 | 0.1 | 0.5 |
| Operating Conditions: | | | |
| Temperature, °F | 80 | 80 | 80 |
| Pressure, p.s.i.g | 100 | 100 | 100 |
| iC₄/nC₇ mol. ratio in feed | 13.3 | 11.4 | 11.4 |
| Contact time, hours | 2.0 | 2.05 | 1.8 |
| HBr, wt. percent of total feed | 2 | 2 | 2 |
| C₅+ Product Composition, Liq. Vol. Percent: | | | |
| C₅+C₆ | 3 | 19 | 73 |
| iC₇ | 26 | 47 | 24 |
| nC₇ (unreacted feed) | 71 | 34 | 3 |

Table C vividly demonstrates the necessity for maintaining free AlBr₃ in the hydrocarbon phase. Additionally, it will be noted that as the amount of free AlBr₃ in the hydrocarbon phase is increased, the yield of desired products is substantially increased. Although as low as about 0.05 wt. percent AlBr₃ in the hydrocarbon phase would substantially increase the product yield, it is preferred a concentration above about 0.1 wt. percent AlBr₃ be maintained in the hydrocarbon phase.

It will be understood that the specific embodiments herein described and the specific examples given are not intended to limit the invention in any manner. The scope of the invention is defined in the appended claims.

What is claimed is:

1. A process for the preparation of branched chain paraffin hydrocarbons of 5 to 7 carbon atoms which comprises reacting a minor proportion of a straight chain paraffin hydrocarbon of from 6 to 18 carbon atoms with a major proportion of a lighter hydrocarbon selected from the group consisting of C₄ to C₅ paraffin hydrocarbons in a reaction zone in the presence of an aluminum bromide-hydrocarbon complex containing at least about 75 wt. percent aluminum bromide, withdrawing from said reaction zone a hydrocarbon stream enhanced in C₅ to C₇ branched chain paraffin hydrocarbons and continuously maintaining in said reaction zone free aluminum bromide whereby said withdrawn hydrocarbon stream will contain at least about 0.1 wt. percent free aluminum bromide.

2. The process as defined in claim 1 wherein free aluminum bromide is maintained in the reaction zone by dissolving said aluminum bromide in a feed stream of the lighter hydrocarbon.

3. The process as defined in claim 1 wherein the reaction zone is maintained at a temperature in the range of from about 50 to 150° F.

4. The process of claim 1 wherein a promoter selected from the group consisting of hydrogen bromide and alkyl bromides is added to said reaction zone.

References Cited in the file of this patent

UNITED STATES PATENTS

| | | |
|---|---|---|
| 2,220,090 | Evering et al. | Nov. 5, 1940 |
| 2,349,458 | Owen et al. | May 23, 1944 |
| 2,406,721 | Veltman | Aug. 27, 1946 |
| 2,411,817 | Thompson et al. | Nov. 26, 1946 |